July 19, 1927.

Re. 16,680

C. L. HOFF

TREAD GRIP

Original Filed April 21, 1923

Inventor:
Carlton L. Hoff

Warren S. Orton
Attorney

Reissued July 19, 1927. Re. 16,680

UNITED STATES PATENT OFFICE.

CARLTON L. HOFF, OF YORK, PENNSYLVANIA, ASSIGNOR TO HOFF METAL PRODUCTS COMPANY, OF NEW YORK, N. Y., A CORPORATION OF DELAWARE.

TREAD GRIP.

Original No. 1,499,579, dated July 1, 1924, Serial No. 633,734, filed April 21, 1923. Application for reissue filed March 10, 1926. Serial No. 14,585.

This invention relates to anti-skid devices such as are used on automobiles of all kinds and has for its principal object the provision of a tread grip which will have longer life, be more effective and of less cost, than devices now available.

An important factor of the present invention lies in the provision of a rotatably mounted tread member surrounding the cross bar of the tread grip to relieve the cross bar of a great portion of the wear that would otherwise be borne by this member and at the same time form an effective traction increasing and anti-skid member between the tire and roadway.

It is not new at the present time to provide a tread grip employing a cross bar provided with a rotary member usually a sleeve but as far as I am aware no angular sleeve has been provided on a cross member of an anti-skid device which would permit the sleeve to turn on its support when the sleeve is away from the ground but which is held against rotation when performing its operative function in contact with the road, this useful effect being obtained in the present instance by having the sleeve non-circular in cross section and preferably having the shape of a hollow prism resembling an isosceles prism.

A number of chains provided with such isosceles prisms have been tested under very severe conditions and it has been found that the sleeves merely oscillate when in contact with the ground and tire, presenting frequently a corner to the pavement and a flat side to the tire and at other times presenting a flat side to the ground and a ridge slightly pressed into the tire. As each tread grip passes to the top of the tire as the latter is rotated the sleeve will be free, since the cross member is not tightly held against the tire and the sleeve will change its position about its support so as to present different edges or sides to the roadway thus distributing the wear evenly about the prism.

The cross bar without the sleeve is itself a tread grip member and is an improvement over existing cross bars in that the wear is distributed partly to the center section of the bar and partly to the two ends which are reversed on themselves to form eyes embracing the usual hooks.

In the drawings,—

Figure 1:
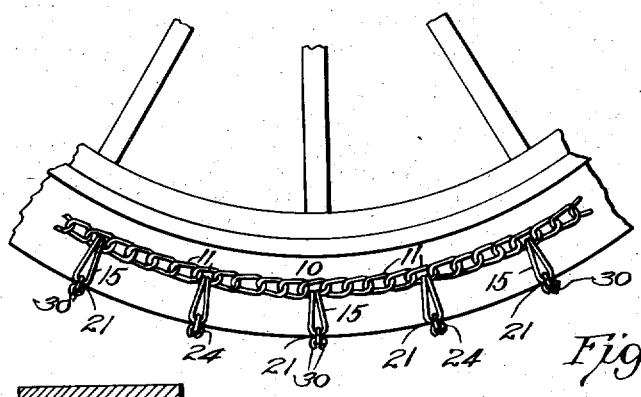
Figure 1 is a side elevation of a portion of an automobile wheel showing a chain employing my improved tread grip in position on the tire.
Figure 2:
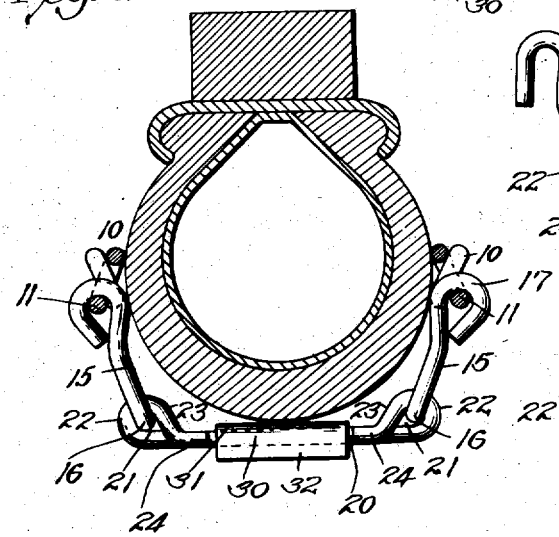
Fig. 2 is a vertical section through the wheel, tire, and chain.

The anti-skid chain shown in Fig. 1 is similar in appearance to many of the chains now in general use consisting of a plurality of side chains 10 of the usual standard links 11 and carrying a considerable number of transverse or cross members each preferably consisting of a pair of hooks 15 of the usual type embracing the eye of my improved cross bar at the center 16 of the hook and embracing a link 11 of one of the chains 10 by its hooked end 17.

Figure 3:
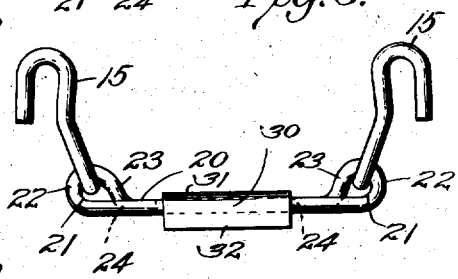
Fig. 3 is preferred form of my tread grip member including the sleeve.
Figure 5:
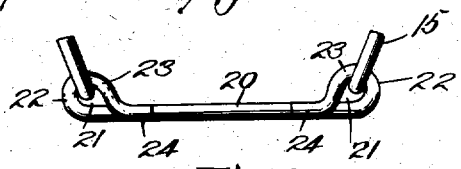
Fig. 5 is a view of the cross bar shown in Fig. 3 but omitting the sleeve, the cross bar itself forming the complete tread grip.

The specific cross-bar of my present invention in its preferred form as shown in Figs. 3 and 5 consists of a single rod having a straight central portion 20 continued out to a point near the center of the eyes 21 and then bent upwardly as at 22 and then downwardly as at 23 to form a closed loop, the end 24 when the loop is finished lying parallel to and in front of the center portion 20 as seen in Fig. 5 so that the axis of the end 24 will be at the same distance from the axis of the wheel and tire as is the axis of the center portion 20 of the rod from which the cross bar is made.

As is apparent from Fig. 5 the two ends 24 will contact with the ground, when the device is in use, at the same time as does the center portion 20 of the cross bar or link so that the wear will be shared by the center and ends. I find it preferable although not at all essential to mount the cross bars on the side chains so that the ends 24 will come in contact with the ground before the center portion 20; in other words, I place the ends 24 so that when they are at the bottom of the wheel or tire they face toward the rear of the vehicle so that the ends of the cross bar wear more than the center portion of the link, retaining the strength of the center portion of the cross bar for a materially greater time. An additional advantage in this construction lies in the fact that should the wheel lose traction by spinning the cross bars will tend to rock thereby presenting an edge, so to speak, to the roadway. In other words the ends 24 will tend to dig into the roadway and so greatly increase the traction of the wheel.

Figure 4:
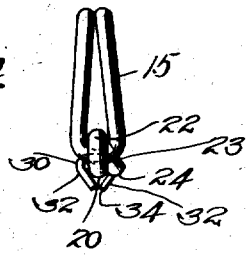
Fig. 4 is an end view of the parts shown in Fig. 3.

The cross bar shown in Fig. 3 is reinforced by a tread member 30 preferably formed of a substantially rectangular sheet of steel bent twice through an angle of 120° so as to form a hollow prism sleeve having a cross section of the shape of an isosceles triangle having a base 31 and two sides 32. The edges of the sheet metal plate from which the sleeve is made are butted together as at 34 to close the prism and form one of the three edges of the sleeve While the edges at 34 are shown sharp in Fig. 4 it has been found that the sleeves in use soon close the joint at 34 and that after one of my sleeve type tread grips has been in use for as much at a hundred miles on hard pavements it is almost impossible to find the joint 34 from the outside of the sleeve, the joint at this time having the appearance of a welded seam.

The size of the triangular central space inside the hollow sleeve is preferably such as to permit free angular shifting of the sleeve on the central portion 20 of the cross bar when the sleeve is thrown away from the tire by the centrifugal action of the wheel and the prism is preferably of such length as to fit loosely between the two coaxial ends 24 of the cross bar whereby a sufficient lateral movement of the sleeve is permitted to prevent any possibility of binding or locking of the parts.

There appears to be no tendency on the part of my sleeves to rotate when in contact with the tire and ground. I do not intend that my side chains 10 shall grip the tire with spring tension, but on the contrary I prefer to mount the two side chains 10 fairly loosely so that the anti-skid chain as a whole will creep slowly with respect to the tire.

Figure 6:
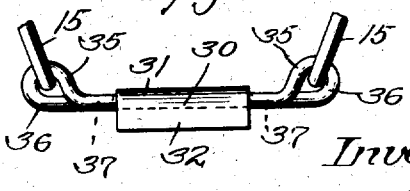
Fig. 6 is a modified form of tread grip including the reinforcing sleeve.

The modified form of cross bar shown in Fig. 6 is generally quite similar to the form shown in Figs. 3 and 5 but is somewhat more expensive to make inasmuch as it is necessary to perform two operations, one to bend the end of the link to form the closed loop or eye as 36. In the modified type, as in the preferred type, the ends here numbered 37 are made coaxial one with another and parallel to the axis of the center portion of the rod.

Having thus described my invention, I claim:

1. In a device of the class described, the combination with a vehicle wheel, of a flexible anti-skid device loosely encircling the tread portion of the wheel, said device including a plurality of tread members each having a rotary movement about a contained axis extending transversely of the plane of the wheel and having its periphery defined by a plurality of wheel engaging faces and with adjacent faces angularly disposed, said member being held from rotary movement when in operative position between the ground and the wheel and, when thrown clear of the wheel by centrifugal action, being free to rotate and then present its different faces to the wheel as it is revolved bodily by the wheel.

2. In an anti-skid device, means for connecting side members, a tread member rotatably mounted on said means and having a plurality of flat sides connected to form acute angle corners and stops for limiting relative axial movement of the tread member on said means while permitting complete rotary movement of said tread member.

3. In an anti-skid device, a transverse cross member comprising a bar, a sleeve loosely mounted on the bar, said sleeve consisting of a metal sheet bent twice to an angle of approximately sixty degrees to form a hollow prism.

4. In an anti-skid device, the combination of a cross-bar, and a sleeve triangular in cross-section rotatably mounted on said cross bar.

5. In a device of the class described, the combination of a tread member having a plurality of substantially flat tread surfaces and means for mounting the member to permit rotation about a contained axis thereby to cause the different surfaces to come into operative position.

6. In an anti-skid device, a transverse cross bar, a sleeve loosely mounted on said cross bar, said sleeve having a plurality of acute angle corners, and means on each of said cross bars for limiting lateral movement of said sleeve said cross bar comprising a single rod bent near its ends to form eyes and with its extremities parallel to the central portion of the bar and at the same distance from the axis of the wheel and tire.

7. In an anti-skid device, a cross bar, a sleeve loosely mounted on said cross bar, and reversely directed ends on said cross bar parallel to the central portion thereof forming stops to limit endwise movement of said sleeve.

8. In an anti-skid device, a cross member including a bar having a central bearing portion, a tread member rotatably mounted on said portion, the ends of said bar being bent to one side of and back upon the central portion to form offset stops for limiting the axial movement of the tread member.

9. In an anti-skid device, a ground engaging member mounted for rotary movement about an axis and outlined by a plurality of substantially flat surfaces, each tangent to a thrown circle about said axis.

10. An anti-skid device for vehicle wheels, including a multi-sided tread member having its adjacent sides angularly disposed and each adapted to contact with the ground or with the wheel on which it is mounted, and means for rotatably mounting said member for movement about a contained axis whereby the tread member is free to rotate and oscillate and thus vary the presentation of its different sides to the wheel and ground.

Signed at New York city, county of New York, and State of New York, this 28th day of Feb. 1925.

CARLTON L. HOFF.